Dec. 26, 1933.  H. WILLIAMS ET AL  1,941,122
BRAKE
Filed Jan. 4, 1930  2 Sheets-Sheet 1
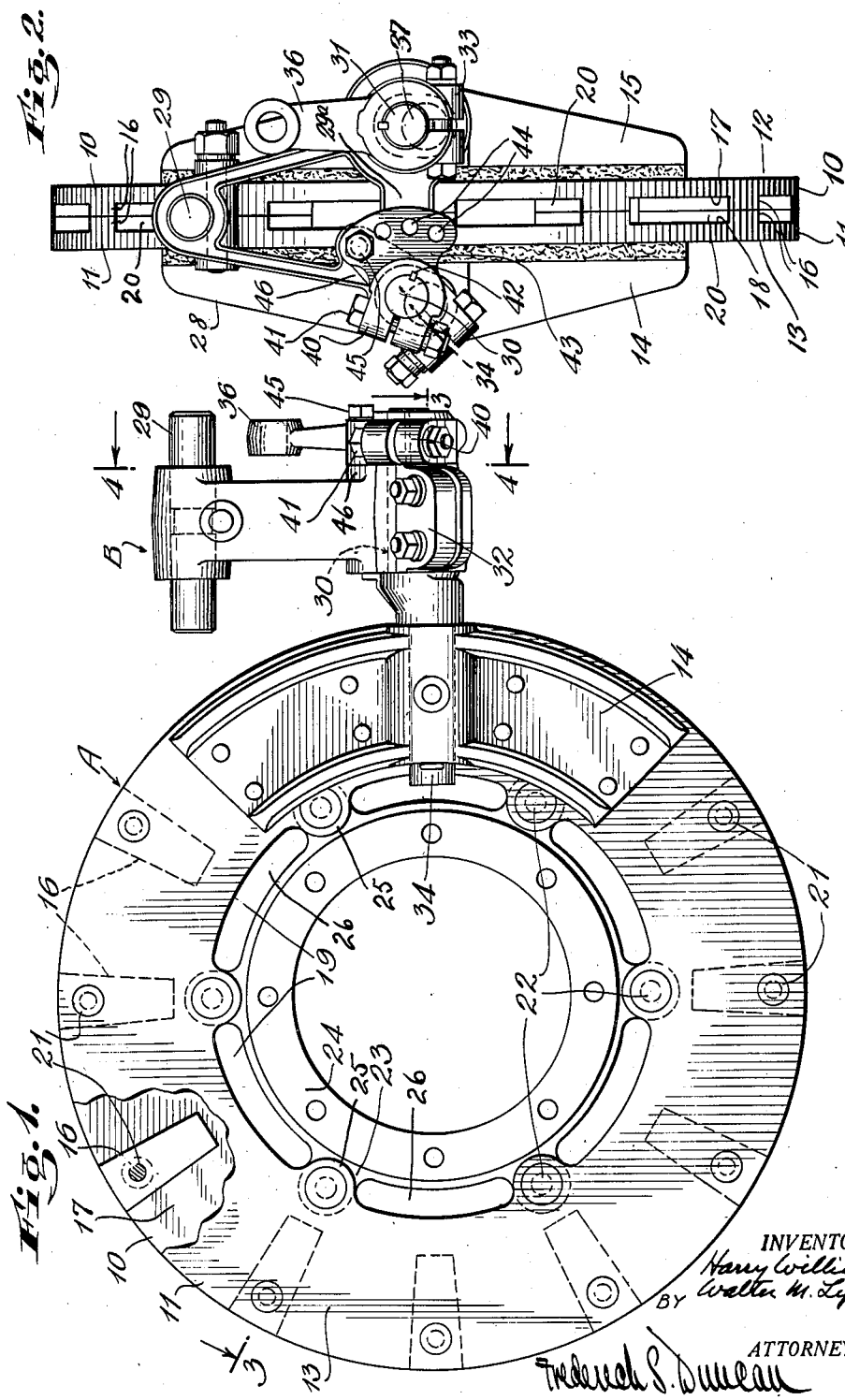
INVENTORS
Harry Williams
Walter M. Lipps
BY
Frederick P. Duncan
ATTORNEY

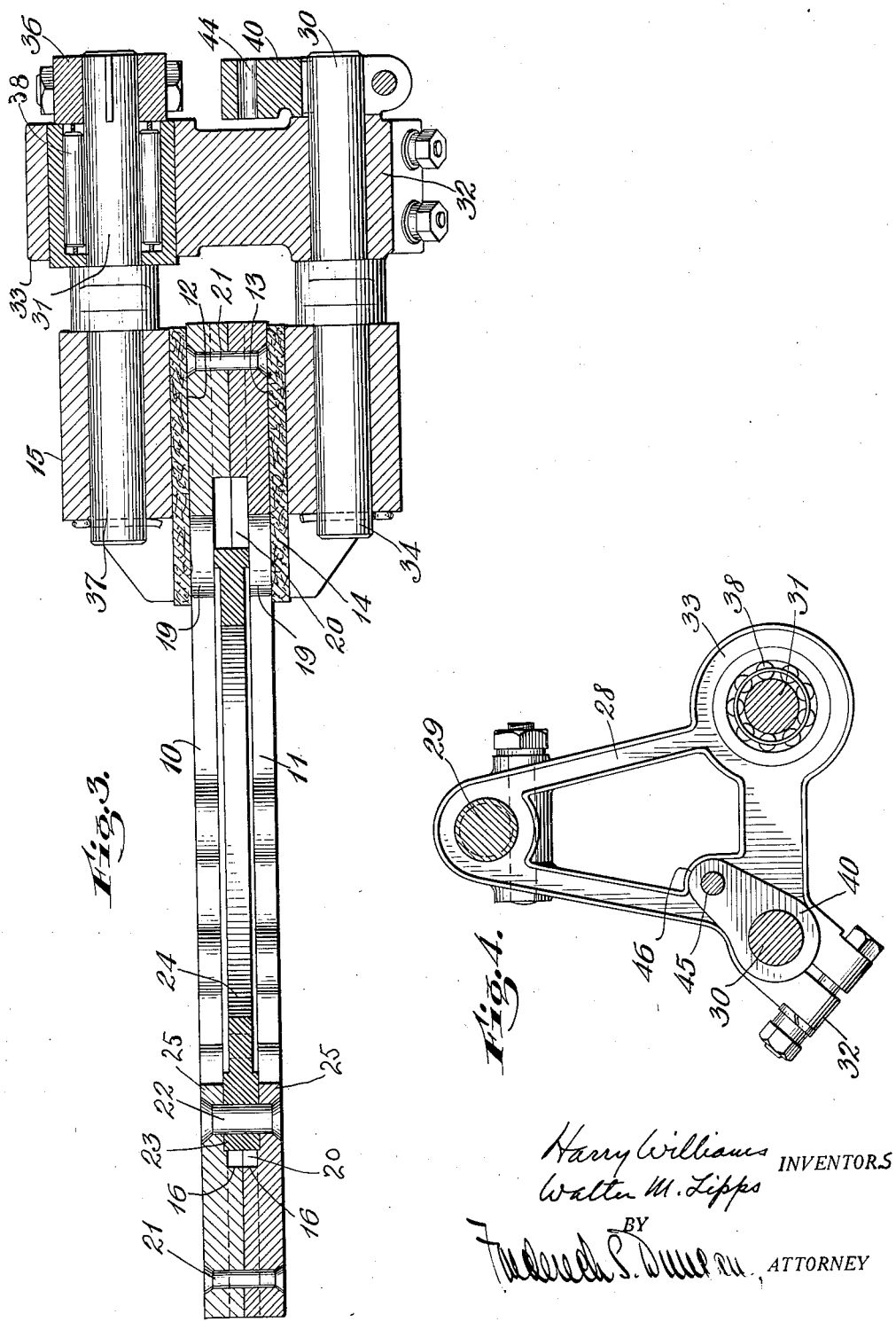

Patented Dec. 26, 1933

1,941,122

UNITED STATES PATENT OFFICE 1,941,122

BRAKE

Harry Williams, Birmingham, and Walter M. Lipps, Detroit, Mich., assignors to American Cable Company, Inc., a corporation of Delaware Application January 4, 1930. Serial No. 418,463

2 Claims. (Cl. 188—264)

This invention relates to brakes for wheels or other rotary members and belongs to that class comprising a disk-like rotor of ventilated structure and a pair of brake shoes which may be operated to grip an annular part of said rotor therebetween.

An object of the present invention is to provide a ventilated rotor of improved form comprising a plurality of separately formed annular disks each having one side provided with a braking surface, and means to secure said disks together with said braking surfaces presented in opposite directions, one or both of said disks having a series of radial ribs spaced apart upon its inner face and one or each disk having a series of cut-out portions disposed in annular arrangement near its central margin and in communication with the radial spaces formed between said ribs and the inner faces of said disks.

A rotor thus characterized has the advantages of fabrication which are due to the fact that it is possible to make the separate disks readily by casting, stamping or forging, and the assembled device is strong and durable.

Another object of the invention is to provide improved means for supporting and operating the co-operating brake shoes in assembled relation with the rotor, and more particularly to provide for compactness and strength of structure, easy adjustment of parts and accessibility for inspection, repairs and replacement of the component parts.

The above and other features of the invention are illustrated and described fully in the accompanying drawings and specification and are pointed out in the claims.

In the drawings:

Fig. 1 is a view in side elevation of a brake assembly in the construction of which the invention has been embodied.

Fig. 2 is a view thereof in front elevation.

Fig. 3 is a sectional view on the line 3—3 of Fig. 1.

Fig. 4 is a sectional view on the line 4—4 of Fig. 1.

In a now-preferred embodiment of the invention selected for illustration and description, the reference character A designates generally a disk-like rotor, and B designates generally the supporting and operating means for the brake shoes co-operating with the rotor.

The preferred form of rotor shown comprises separately formed annular disk members 10 and 11, of suitable material and general contour, preferably made by casting, stamping or forging, each of the disks having one side, as for example that numbered 12 on the disk 10, and that numbered 13 on the disk 11, formed with a suitable braking surface, these surfaces being presented outwardly when the disks are assembled, for co-operation with suitable brake shoes 14 and 15, supported in position to grip the outer marginal portion of the rotor therebetween.

One or both of the disk members 10 and 11 are provided with a series of radial ribs 16, spaced apart upon its inner face, and preferably formed integrally as a part of the casting, stamping, or forging operation, and these ribs may be advantageously of substantially the proportions illustrated, extending inward from the periphery of the disk for approximately one-third of the radius, the distance between the ribs being sufficient to leave broad ventilating spaces formed between adjacent ribs and the inner faces 17 and 18 of the disks 10 and 11.

The disk 11 is shown as provided, in pursuance of the invention, with a series of apertures or recesses 19, preferably taking the form of arcuate slots, in annular arrangement at or near the central margin of the disk, and communicating with the aforesaid radial ventilating spaces 20 between the ribs. Preferably each slot is of sufficient length to communicate with at least two of the radial ventilating spaces. Both disks may be thus apertured, if desired.

Suitable means are provided to connect the disk members 10 and 11 in assembled relation, and for this purpose rivets 21 are shown, near the outer margins of the annular disks, and other rivets 22, near the inner margins thereof, the latter rivets passing through the lugs 25 of the disks and also passing through arms 23 of a spider ring 24 which is shown as a suitable means for connecting the rotor with a suitable part of an automobile wheel or other rotating part, which is not shown, as such connections are well-known to those skilled in the art.

In further pursuance of the invention, suitable means are provided to support the brake shoes 14 and 15 in cooperative relation with the rotor, and for this purpose a now-preferred embodiment comprises a yoke 28 mounted upon a shaft 29 journalled in suitable bearings (not shown) provided upon any suitable adjacent portion of the chassis of an automobile, or any other suitable structure in connection with which the brake is to be used. This yoke accordingly constitutes a supporting means adapted to swing freely about the axis of its shaft 29, so that the arms of the yoke are freely movable as a unitary structure at an angle with respect to the rotor, and the yoke is furnished with rock-shafts 30 and 31 mounted in split bearings 32 and 33 upon the arms of the yoke, and at least one of the rock-shafts is provided with an offset portion 34 (see Fig. 1) upon which is fitted pivotally the brake shoe 14, the other brake shoe 15 being similarly fitted upon the rock-shaft 31 which constitutes in the instance illustrated the operating member of the brake assembly, having a crank arm 36 adapted to be connected with a suitable brake rod or cable, or other actuating member (not shown) running to the usual means for operating such brakes, as for example the emergency lever of an automobile. To stiffen the yoke the two ends are connected by an integral cross bar 29a.

Preferably the shaft 31 is provided with an eccentric or offset part 37 carrying the brake shoe 15, so that when the shaft 31 is turned by the crank arm 36, the brake shoe 15 is forced against the braking surface of the disk 10, while at the same time the yoke is swung upon the shaft 29 so that the shaft portion 34 forces the brake shoe 14 against the outer cooperating braking surface 13 of the disk 11, in the manner characteristic of this well-known type of brake which does not require further description. The yoke is preferably provided with a roller bearing or suitable anti-friction device 38 to permit easy actuation of the brake by the crank arm 36.

In the preferred form of brake illustrated, suitable means are provided to permit ready adjustment of the shaft 30 to obtain the desired relative position of the brake shoes 14 and 15 both at the time of initial assembly, and for the purpose of taking up wear. For this purpose the shaft 30 is shown as having a split collar 40 fitted non-rotatively thereon by suitable means, such as the bolt 41 and key 42, this collar having a lug 43 provided with a series of holes 44, through the selected one of which a locking bolt 45 extends into a suitable threaded boss 46 of the yoke. (See Fig. 2.)

By means of this adjustment the shaft 30 may be set with its offset portion 34 in the desired angular position relatively to the central axis of the shaft, and at the desired distance from the axis of the shaft 31.

From the above description it will be readily seen that the brake assembly embodying the various features of this invention is very compact, strong, easily operated, and the parts thereof are notably accessible for adjustment, repairs and replacements.

The rotor structure likewise is inexpensive to make, inasmuch as the pair of disks can be easily cast, stamped or forged and require but little machining and that of a simple and inexpensive character. When assembled with the supporting spider, the parts constitute a unitary structure of a very sturdy character, and thorough ventilation of the rotor is provided for by the ample ventilating spaces between the ribs, to which access of an ample supply of cooling air is afforded by the position and extent of the ventilating slots 26, formed as above described between the recessed portions 19 of the disks and spider.

Fig. 4 shows also auxiliary means for holding the shaft tightly in any adjusted position, this auxiliary means comprising a split clamp 32 formed integrally with the yoke 28 and adapted to be tightened upon the shaft 30.

Having thus described our invention, what we claim as new and desire to secure by Letters Patent is:

1. A rotor for brakes of the class described, said rotor comprising a pair of annular disks each having one side provided with a braking surface, and means to secure said disks together with said braking surfaces presented in opposite directions, one of said disks having a series of radial ribs spaced apart upon its inner face and one of said disks having a series of arcuate slots disposed in annular arrangement around its central margin and in ventilating communication with the radial spaces formed between said ribs and the inner faces of said disks, and a spider having arms projecting between said cut-out portions in line with alternate ribs, said spider cooperating with said cut-out portions to form arcuate slots and each of said arcuate slots being in communication with two adjacent radial spaces between said spider arms, and said spider arms being secured to said disks by said means which secure said disks together.

2. A rotor for brakes of the class described, said rotor comprising a pair of annular disks each having one side provided with a braking surface, means to secure said disks together with the said braking surfaces presented in opposite directions, one of said disks having on its inner face a series of ribs for spacing the disks and for dividing the space between the disks into ventilating channels leading from the inner periphery of said disks to the outer periphery thereof, a spider having arms projecting between said disks, apertures formed between the ring of said spider and the inner periphery of said disks, said apertures being in communication with said channels, and the said spider arms being secured to said disks by means which secure said disks together.

HARRY WILLIAMS.
WALTER M. LIPPS.